Feb. 5, 1952  C. MITCHELL  2,584,488
LOGGER'S PIKE
Filed Sept. 6, 1946  2 SHEETS—SHEET 1
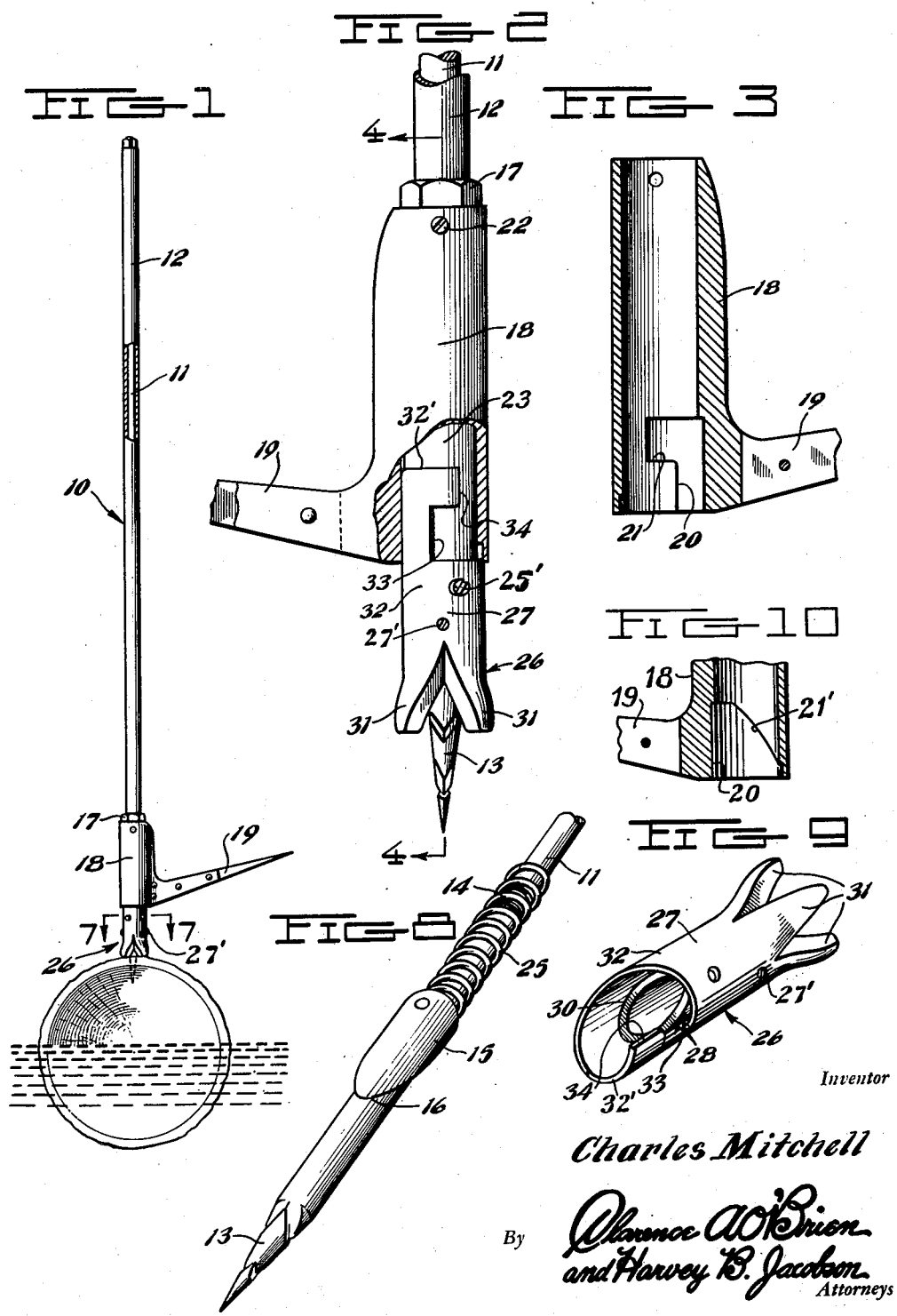
Inventor
Charles Mitchell
By Clarence A. O'Brien
and Harvey B. Jacobson
Attorneys Feb. 5, 1952 — C. MITCHELL — 2,584,488
LOGGER'S PIKE
Filed Sept. 6, 1946 — 2 SHEETS—SHEET 2
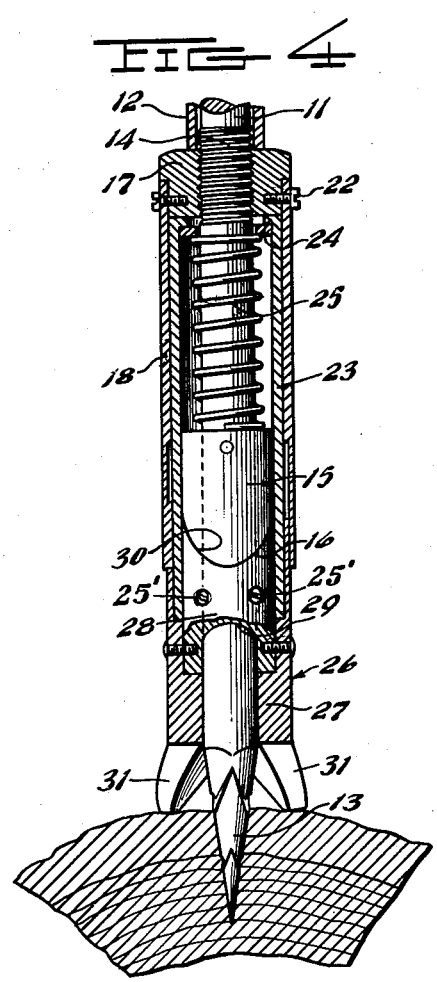
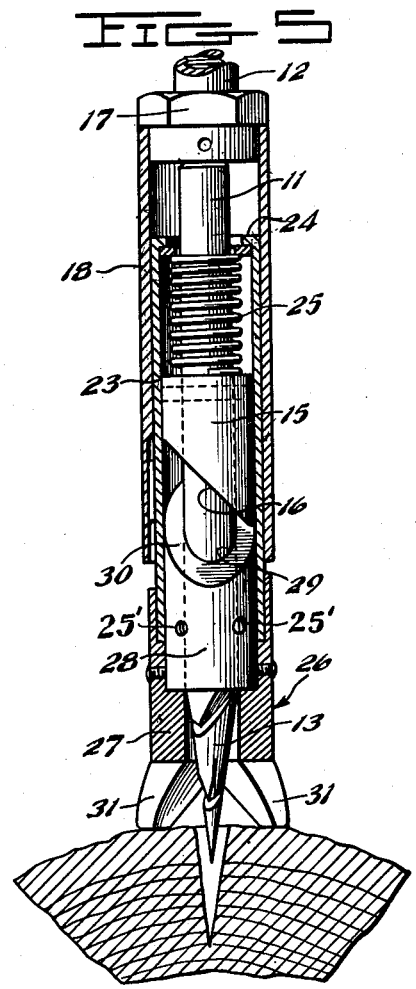
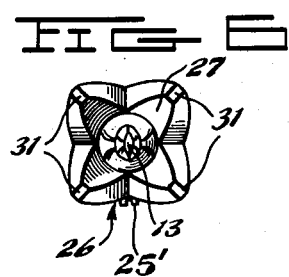
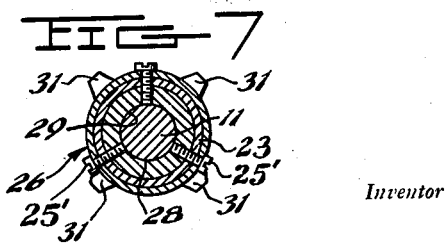
Inventor
Charles Mitchell
By Clarence A. O'Brien
and Harvey B. Jacobson
Attorneys Patented Feb. 5, 1952

2,584,488

UNITED STATES PATENT OFFICE 2,584,488

LOGGER'S PIKE

Charles Mitchell, Longview, Wash., assignor to Helen Mitchell

Application September 6, 1946, Serial No. 695,081

9 Claims. (Cl. 294—61)

1

This invention relates to a logger's pike and has for its primary object readily to release the spear of a pike from a log into which it has been driven.

Another object is to conserve time and energy by enabling a logger easily and quickly to extract his pike from a log.

Another object is to conserve life and avoid injury to persons engaged in the handling of logs by permitting his pike to be easily and quickly maneuvered according to the demands of the instant.

The above and other objects may be attained by employing this invention which embodies among its features a pike shaft, a head fixed to one end of the shaft and a retractable spear projecting from the head, together with means easily and quickly to retract the spear with relation to the head in order to permit the pike readily to be disengaged from a log.

Other features include a spur projecting laterally from the head and movable in an arc concentric with the axis of the head and means operable by the movement of the spur to retract the spear.

Still other features include means automatically to return the spear to projected position after each retraction thereof.

In the drawings:

Figure 1 is a view of a logger's pike embodying the features of this invention illustrating its manner of use.

Figure 2 is a side view of the pike head, certain portions being broken away more clearly to illustrate certain details of construction.

Figure 3 is a longitudinal sectional view through the sleeve which encircles the pike head and by means of which the spear is retracted.

Figure 4 is a longitudinal sectional view through the pike head illustrating the spear driven into a log.

Figure 5 is a view similar to Figure 4 showing the spear retracted.

Figure 6 is a bottom plan view of the pike head illustrated in Figure 4.

Figure 7 is a transverse sectional view taken substantially along the lines 7—7 of Figure 1.

Figure 8 is a fragmentary perspective view of the spear illustrating the cam and spring in detail.

Figure 9 is a perspective view of the log engaging foot, illustrating the position of the cooperating spear actuating cam, and Figure 10 is a longitudinal sectional detail view being taken in the opposite direction to that

2 shown in Figure 3 illustrating the form of the groove in the sleeve.

Referring to the drawings in detail, my improved logger's pike designated generally 10 comprises a shaft or staff 11 mounted for rotation in a tubular handle 12 and carrying at one end a spear point 13. Formed on the staff 11 in spaced relation to the spear 13 are external screw threads 14, and fixedly carried between the threads 14 and the spear 13 is a sleeve 15 provided at the end facing the spear with a cam face 16, the purpose of which will be more fully hereinafter explained.

Threaded on the external screw threads 14 is a collar 17 supporting at its periphery a sleeve 18 which extends from the collar toward the spear 13 so as partially to encase that portion of the staff 11 lying between the threads 14 and the spear 13. Extending radially from the sleeve 18 adjacent the end nearest the spear 13 is a spur 19 which not only serves as a logging hook but also performs the function of a release lever for the pike. Formed in the wall of the sleeve 18 and entering from the end adjacent the spur 19 is a substantially L-shaped groove 20 the arm 21 of which extends in a plane perpendicular to the axis of the sleeve. The groove 20 also has a boundary 21' of spiral configuration, as shown in Figure 10. The end of the sleeve opposite that carrying the spur 19 is fixed to the collar 17 by any suitable fastening means 22, so that the sleeve 18 will be fixedly associated with the staff 11.

Mounted for longitudinal sliding movement within the sleeve 18, and surrounding the collar 15 and a portion of the staff lying between the spear 13 and the threads 14 is a tubular member 23 carrying at one end an inturned flange 24 which normally lies against the nut 17 and forms an abutment for one end of a compression coil spring 25 which surrounds the staff 11 between the collar 15 and the nut 17. It will thus be seen that the tubular member 23 is yieldingly urged against the nut 17 as will be readily understood upon reference to Figures 4 and 5. Slidable with and secured to the end of the tubular member 23 opposite the flange 24 as by screws 25' is a foot designated generally 26 which comprises a tubular body 27. Slidably associated with the staff 11 adjacent the spear 13, and fixed to the tubular body 27 as by screws 27' is a hollow cylindrical cam member 28 provided with an axial bore 29 through which the staff 11 is adapted to slide. The inner end of the cam member 28 is formed with a cam face 30 which is adapted to cooperate with the cam face 16 of the collar 15 previously referred to. It will thus be seen that when the sleeve 18 is rotated with relation to the foot 26 the staff 11 will move longitudinally through the sleeve, to retract the spear 13 as illustrated in Figure 5. Projecting from the end of the body 27 toward the point of the spear 13 are spaced prongs 31 which cooperate with the spear in biting into the surface of a log when the pike is in use. Extending upwardly from the sleeve in the direction opposite the prongs 31 is a collar 32 the end edge of which opposite the prongs is of spiral configuration terminating in a flat portion 32', and formed at the innermost end of the spiral is a recess 33 forming a tongue 34 which when the parts are assembled rides in the L-shaped groove 20 formed in the sleeve 18, the spiral boundary 21' of the groove 20 allowing reception of the collar 32 in the groove 20.

In use it will be understood that the pike 10 is grasped in the hands of the user and the spear 13 thrust into a log as suggested in the drawings. The thrust is sufficient to not only enter the spear 13 into the log but also to cause the prongs 31 to bite into the surface of the log as suggested in Figures 1, 4, and 5. When it is desired to release the pike it is only necessary to swing the spur 19 in an arc about the axis of the staff 11 thus causing the cam faces 16 and 30 to ride on one another into the position illustrated in Figure 5 so as to retract the spear 13 from its position in the log and simultaneously compress the spring 25. Upon removing the pike pole from the log it is obvious that the compression of the spring 15 will cause the cam faces 16 and 30 to impart rotary motion to the staff 11 so that the spear 13 will return to its original projected position, ready for a repeat operation.

However, when it is desired to lock the prongs 31 against axial movement relative to the spear 13 in the position shown in Figure 4, the prongs 31 may be rotated sufficiently about the axis of the spear 13 to seat the tongue 34 in the arm 21 of the groove 20, it being understood that there is sufficient play between the parts to permit such locking rotation before the cams commence to forcibly urge axial extension of the prongs 31. Thus reliance need not be placed solely in the spring 25 to retain the prongs 31 in the retracted position shown in Figure 4.

While in the foregoing there has been shown and described the preferred embodiment of this invention it is to be understood that minor changes in the details of construction, combination and arrangement of parts may be resorted to without departing from the spirit and scope of the invention as claimed.

What I claim:

1. A logger's pike which includes a staff, a spear at one end of the staff, a sleeve surrounding the staff adjacent the spear, prongs on the sleeve for cooperation with the spear in holding a log and means responsive to relative rotation between said sleeve and said spear to establish relative longitudinal movement between the sleeve and the spear to extract the spear from lodgement in a log.

2. A logger's pike which includes a staff, a spear at one end of the staff, a sleeve surrounding the staff adjacent the spear, prongs on the sleeve for cooperation with the spear in holding a log and means responsive to relative rotation between said staff and said sleeve to establish relative longitudinal movement between the sleeve and the spear to extract the spear from lodgement in a log and a spur on the sleeve by which such relative rotation may be initiated.

3. A logger's pike which includes a staff, a spear integral with one end of the staff, a cam on the staff near the spear, a sleeve rotatably associated with the staff near the spear, a cam on the sleeve for cooperation with the cam on the staff to cause relative longitudinal movement of the sleeve and staff when the staff is rotated and spurs on the sleeve for engagement with a log to hold the sleeve against rotation when the staff is rotated.

4. A logger's pike which includes a staff, a spear integral with one end of the staff, a cam on the staff near the spear, a sleeve rotatably associated with the staff near the spear, a cam on the sleeve for cooperation with the cam on the staff to cause relative longitudinal movement of the sleeve and staff when the staff is rotated and spurs on the sleeve for engagement with a log to hold the sleeve against rotation when the staff is rotated and a spur connected to the staff by which the staff may be rotated.

5. A logger's pike which includes a sleeve, prongs extending longitudinally from one end of the sleeve, a staff rotatably and slidably supported in the sleeve, a spear on one end of the staff normally projecting beyond the pronged end of the sleeve and means operable upon rotation of the staff to retract the spear into the sleeve.

6. A logger's pike which includes a sleeve, prongs extending longitudinally from one end of the sleeve, a staff rotatably and slidably supported in the sleeve, a spear on one end of the staff normally projecting beyond the pronged end of the sleeve and means operable upon rotation of the staff to retract the spear into the sleeve and means automatically to restore the spear to its normal projected position.

7. A logger's pike comprising an elongated shaft having a pointed end for penetrating engagement of a log, a sleeve surrounding the shaft, said sleeve being rotatable on and movable longitudinally of the shaft, log engaging means on the end of the sleeve adjacent the pointed end of the shaft, and cam means for positively moving the sleeve towards the pointed end of the shaft in response to relative rotation of the sleeve and the shaft, whereby the shaft may be turned while the sleeve is held against rotation by the log engaging means so that the sleeve will push a log away from the pointed end of the shaft.

8. A logger's pike comprising an elongated shaft having a pointed end for penetrating engagement of a log, a sleeve surrounding the shaft, said sleeve being rotatable on and movable longitudinally of the shaft, spring means yieldingly urging the sleeve away from the pointed end of the shaft and towards the other end of the shaft, and means for limiting movement of the sleeve towards the other end of the shaft, log engaging means on the end of the sleeve adjacent the pointed end of the shaft, and cam means for positively moving the sleeve towards the pointed end of the shaft in response to relative rotation of the sleeve and the shaft, whereby the shaft may be turned while the sleeve is held against rotation by the log engaging means so that the sleeve will push a log away from the pointed end of the shaft.

9. A logger's pike comprising an elongated shaft having a pointed end for penetrating engagement of a log, a sleeve surrounding the shaft, said sleeve being rotatable on and movable longitudinally of the shaft, log engaging means on the end of the sleeve adjacent the pointed end of the shaft, means for releasably locking the sleeve against longitudinal movement on the shaft, and cam means for positively moving the sleeve towards the pointed end of the shaft in response to relative rotation of the sleeve and the shaft, whereby the shaft may be turned while the sleeve is held against rotation by the log engaging means so that the sleeve will push a log away from the pointed end of the shaft.

CHARLES MITCHELL.

REFERENCES CITED

The following references are of record in the file of this patent:

UNITED STATES PATENTS

| Number | Name | Date |
|---|---|---|
| 8,019 | Sullivan et al. | Nov. 28, 1905 |
| 1,186,831 | Price | June 13, 1916 |
| 1,234,794 | Orson | July 31, 1917 |
| 1,483,445 | Holton | Feb. 12, 1924 |
| 2,228,690 | Crary | Jan. 14, 1941 |
| 2,465,024 | Ludt | Mar. 22, 1949 |